UNITED STATES PATENT OFFICE.

WM. A. PRATT, OF ALEXANDRIA, DISTRICT OF COLUMBIA.

IMPROVEMENT IN COLORING DAGUERREOTYPE-PICTURES.

Specification forming part of Letters Patent No. 4,423, dated March 14, 1846.

*To all whom it may concern:*

Be it known that I, WILLIAM A. PRATT, of Alexandria, in the District of Columbia, have invented a new and Improved Method of Finishing Daguerreotype Miniatures; and I do hereby declare that the following is a full and exact description.

After having taken a picture according to the usual method, and having gilded it, I proceed with varnish-colors (mixtures of different coloring substances with mastic or copal varnish) to paint on the glass which is intended to cover the picture any design—such as clouds, plain black walls, curtains, chairs, couches, or any desirable accessories; also working up the daguerreotype itself to a degree of finish similar to oil-painting with the same colors; then laying the daguerreotype on the glass a complete junction is formed from the sticky or adhesive nature of the varnish-color used. It is then submitted to pressure until perfectly dry, when I proceed, by the aid of nitric acid, to reduce or dissolve the copper backing to any desirable thickness. After this is done any part of the picture may be cut away at the pleasure of the operator and a new picture, prepared as before, attached. When it is wished to attach the portraits of two individuals to the same plate of glass all that is necessary is to cut away with a graver all the first plate attached on the side of the portrait to which the additional figure is to be appended, and then joining on the second plate, concealing the joint by means of the double surface of glass and metal, both or one of which may be colored.

The same process may be successfully used in making very large portraits of the same individual, as the dress may be attached to the head and a chair to that in the same manner, or the dress may be painted on either the glass or plate, as may seem best to the operator. By this means we may produce any size picture that our glass will allow, and protect them by afterward covering the whole back with varnish and lamp-black.

What I claim as my invention, and desire to secure by Letters Patent, is—

The method above described of joining two or more portraits or portions of portraits together, and the producing artificial backgrounds on the glass, which from their nature cement themselves and the glass on which they are painted to the pictures, and which also enables the operator to produce any size picture that his glass will allow with even a small-sized instrument, which last has many advantages which will in course of practice suggest themselves, the whole producing a beautiful enameled appearance and perfectly protecting the delicate picture from contact with either air or damp.

WILLIAM A. PRATT.

Witnesses:
 PETER W. SIMPSON,
 JOHN S. GRUBB.